United States Patent [19]

Chase

[11] 3,725,105

[45] Apr. 3, 1973

[54] ADHERENT RESIN WITH RELEASE SURFACE

[76] Inventor: Raymond Burt Chase, 2549 Midland Road, Midland, Mich.

[22] Filed: Mar. 19, 1971

[21] Appl. No.: 126,284

Related U.S. Application Data

[63] Continuation-in-part of Ser. No. 842,405, July 16, 1969, abandoned, which is a continuation-in-part of Ser. No. 535,324, March 18, 1966, abandoned.

[52] U.S. Cl. ............... 117/2 R, 117/94, 117/124 E, 117/124 F, 117/132 BE, 117/132 BS, 117/161 ZA, 117/161 ZB, 260/824 EP
[51] Int. Cl. ..................... C03c 17/00, B32b 15/08
[58] Field of Search........117/2 R, 161 ZA, 161 ZB, 117/124 E, 124 F, 132 BE, 132 BS, 94; 260/824 EP

[56] References Cited

UNITED STATES PATENTS

| | | | |
|---|---|---|---|
| 3,556,754 | 1/1971 | Marsden | 260/824 EP |
| 3,427,190 | 2/1969 | Murdock | 117/2 R |
| 2,955,952 | 10/1960 | Herbst | 117/2 R |
| 3,170,962 | 2/1965 | Tyler | 260/824 EP |

*Primary Examiner*—Alfred L. Leavitt
*Assistant Examiner*—M. F. Esposito
*Attorney*—Griswold & Burdick, Albin R. Lindstrom and Richard G. Waterman

[57] ABSTRACT

Cured epoxy resin containing finely powdered silicone resin as filler adheres to a surface but does not conduce to formation of adherent deposits upon its own surface; the silicone is a poly-approximately-monosubstituted siloxane. The product is useful as a repair or lining or coating material for vessels upon the walls of which accumulation of deposits of adherent material is contraindicated.

8 Claims, No Drawings

ADHERENT RESIN WITH RELEASE SURFACE

RELATIONSHIP TO OTHER CASES

The instant specification and claims constitute a continuation-in-part of my co-pending specification and claims Ser. No. 842,405 filed July 16, 1969 now abandoned which was a continuation-in-part of Ser. No. 535,324, filed Mar. 18, 1966 now abandoned.

BACKGROUND OF THE INVENTION

1. Field of the Invention

This invention is concerned with resinous coatings, broadly, and more particularly presents a specially modified form of an epoxy resin coating. The epoxy resin art is generally so well known as not to require description here: except for the modification fully set forth hereinafter, the epoxy resins here employed are conventional.

This invention is concerned also with a coating based upon an epoxy resin which is characterized by unusual release properties in the sense that substances in contact with its surface have much less tendency to adhere or be retained upon such surfaces than is the case with most coating substances.

2. The Prior Art

Epoxy resins have been widely used as coatings and as patching materials for coatings on a variety of substrata. Illustrative of the many patents in this area are U. S. Pat. No. 2,955,952 issued Oct. 11, 1960 and U. S. Pat. No. 3,427,190 issued Feb. 11, 1969.

The use of silicone resins, generally to enhance release from a surface, has been well developed. Curable precurser mixtures have oftentimes been applied as a spray or by swab to surfaces of, for example, bread pans; and thereafter the coating article heated to bring about a chemical reaction or "cure" of the silicone resin in contact with the supporting structure surface. Silicone fluids have been used as release agents in molds of great diversity. Such fluid is also oftentimes applied as a thin layer inside a glass vial which is intended to hold a deliverable liquid medicinal substance in measured quantity; the difficulty of wetting a silicone-treated surface assures virtually complete delivery of a measured, contained liquid from a vessel thus treated.

In all these applications, the silicone material has been of a sacrificial nature in the sense that through use it tended strongly to become consumed or eroded or otherwise become lost away from the surface upon which it was applied. Thus, in the instance of a bread pan treated with a silicone resin cured in situ, after a limited number of uses in which dough is positioned within the pan and the resulting loaf of bread baked, the silicone resin surface has been lost to such extent that it must be replaced if the release function is to persist.

In all such uses where adherence of any significant extent is necessary, it is believed that it has hitherto been requisite to supply the silicone resin in the form of reactive precursor substances, typically reactive precursor substances containing, or in reaction producing, strongly acidic moieties, some of which moieties probably react with and thereby enhance bonding to a metal supporting surface.

Organosilicon-epoxy resin compositions are taught in U. S. Pat. No. 3,170,962 issued Feb. 23, 1965. In those compositions the silicone compound and the epoxy resin are reacted to form a novel resinous substance.

SUMMARY OF THE INVENTION

The present invention is concerned with a curable resinous substance manifesting simultaneously elastic mechanical strength, cohesiveness, adhesiveness and a release surface. Having this combination of properties, the present composition is adapted to be used as the substance of, or in coating or repair of, articles or structures in which cohesive strength and adhesive bonding on one hand, are desired in combination with, on the other hand, release surface properties that minimize accumulations of unwanted substances in contact therewith.

The present resin can be shaped with great versatility before it is cured, that is, before it is caused to harden by chemical action. When cured, it is resistant to many kinds of chemical attack and is not as severly injured by exposure to heat, light and similar influences, at levels of severity that would damage many kinds of resins. The resin can be colored or tinted as desired. The cured resin is unusually machinable. Whereas most cured epoxy resins yield under cutting tools with a conchoidal, vitreous fracture, the resin modified according to this invention yields to machining in a manner that experienced machine tool operators describe as being almost exactly comparable with magnesium or other readily machinable metal.

Having these properties, this resin is unusually well adapted to be used to make, or to coat the working surfaces of, or to repair, bathroom fixtures, sanitary vessels, resin or refractory coated metals, dishes and the like, with or without reinforcing substances such as glass filament and the like; or to constitute a lining or interior or exterior coating material for a wide range of articles.

More particularly, the resinous substance of this invention is of flexibility superior to that of either of the components from the combination of which it can be regarded as composed; and thereby better resists vibrational fatigue, impact shock, and mechanical stress generally.

Therefore, articles or coatings or surface applications composed substantially of the resinous material of this invention are of particular usefulness either as original structures or coatings or the like or as replacement or repair coatings for other materials such as glass or vitreous or ceramic coated or lined substances of which the original surface material has been damaged or lost.

When used as a coating on the interior of oil and gas pipe lines, the surface release properties of the resin of this invention tend to postpone and inhibit the build-up of solid paraffins. Also, the material is particularly useful in the lining of tank cars, the lining of cargo space in hopper cars, ships, barges, grain cars, portable and palleted containers; grain bins and storage places in which the bridging and building up of deposits of grain and the like is inadmissible; and in bulk storage applications in general.

The resinous material of this invention is of very low water permeability, and during such processes as curing and the like, exhibits very little shrinkage. Because of its machinability when cured, and the fact that it is applied as a near-liquid or semisolid paste, it is of great value in the restoration and replacement of broken or eroded structural parts; conveniently, a deposit of this adherent machinable resin is built up to a bulk sufficient that the desired restoration or replacement part can be made from the spontaneously formed mass by shaping, machining, and the like after it has hardened. The instant resin shows excellent strength and adhesion under tension but better strength and adhesion under compression. It is particularly adapted to be used in any situation where clean-up and inspection of a surface between uses is regarded as mandatory. The resin is therefore of extraordinary value in those situations in which quality control requires clean-up between uses of any facility. Being insoluble it is adapted to be used where a lining material is wanted but must not yield contaminants to contents.

One application in which the present resin excels is in the repair of glass linings of chemical reactor and storage vessels.

Many systems have been employed for the repair of glass linings of chemical vessels, and among them is the use of epoxy resins. However, when epoxy resins are used, with or without resistant metal covers, there arises in certain kinds of chemical use a problem, which can be a serious problem, that the chemical substances or their reaction product or substance in storage tends to accumulate upon the patch by reason of some kind of physical or chemical affinity between the patch substance the the substances in the reactor vessel, whereby non-uniformity in product tends to occur.

According to the present invention, there has been discovered a material useful in patching a glass lining of a vessel, which material bonds with glass and with metal so strongly that, in many applications, it does not require a metal cover; yet which has, despite its adhesivity and cohesivity, the property that chemical substances noted for formation of film and like deposits upon other patch materials do not significantly adhere to it.

The present invention is also adapted to be used as an original, continuous or discontinuous, adherent lining or coating, to cover a surface, the resulting covered surface being characterized that, in contact with a substance that oftentimes leaves an adherent deposit, or coating, the surface of the instant invention manifests little tendency to permit such coating to adhere. The instant coating is better adapted to use as a coating on interior surfaces in which it is under compression than to applications upon exterior surfaces where it will be in at least some tension; but it can be used in either orientation.

The present invention is useful also as a surface in circumstances wherein a particulate contents that is to be discharged, or removed, is susceptible of "bridging" of particles with temporary very light bonding to side walls, whereby orderly removal or discharge is handicapped. Walls and throats and the like coated with the filled resin of this invention have little tendency to permit the accumulation of particles necessary for "bridging" to take place.

When modified by not only a polysiloxane but by also a pigment or the like, the instant resin serves as a paint.

DETAILED DESCRIPTION OF THE INVENTION

The composition of the present invention is essentially an epoxy resin modified by containing, as modifying filler, a solid polysiloxane resin. The polysiloxane filler is not believed to react with any part of the epoxy system; but to act only as a solid filler insoluble in the epoxy resin. Such siloxane resins are highly crosslinked. Each methylbearing silicon atom is bonded through oxygen to another silicon atom except that, at the termini of the macromolecule, miscellaneous other moieties such as methyl, or hydrogen, or trimethylsilyl, or other groups may appear. These resins are well known and can be represented by the formula

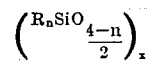

wherein R is a monovalent hydrocarbon radical or a halogenated monovalent hydrocarbon radical, $n$ is a number from 0.9 to about 1.5, and $x$ is a number generally large, representing the degree of polymerization. The preferred substituent, R, is methyl.

The exact nature of the poly-1,2-epoxide to be cured to obtain an epoxy resin is not critical, but very satisfactory results have been obtained when employing a conventional polyepoxide, the diglycidyl ether of a bisphenol, such as bisphenol F or bisphenol A.

Good results are also obtained when the curable poly-1,2-epoxide is a polyglycidyl ether of a novolak; or when fire retardancy and flame resistance in the resulting product are desired, then portions of the hydrogen, such as the hydrogen on aromatic nuclei, normally present in such polyepoxide can be replaced with halogen such as bromine; chlorinated starting materials are also useful where fire retardancy is desired.

Yet another poly-1,2-epoxide useful according to this invention is such polyepoxide of a polylower alkylene glycol. All these materials are conventional and well-known in the art and are articles of commerce.

Such curable polyepoxide may be supplied to the present invention as an unmodified chemical substance, or after partial cure, to obtain a more viscous resin cured to completion more quickly than when using the unmodified polyepoxide. Moreover, such partially cured resin can be solvent thinned if desired.

Curing agents to be employed are not critical and can be the well known catalytic or co-reactive curing agents, or both; such as primary and secondary amines, alkali metal hydroxides, monobasic organic acids, anhydrides of dibasic acids, stannic chloride, or boron trifluoride. When latency is desired, in the curing action, an oxazine or oxazoline or a bis-oxazine or oxazoline curing agent can be employed. An oxazine or oxazoline curing agent will be preferred when control of corrosion of underlying metal is desired.

These identities and related matters are known in the art.

In carrying out the present invention, the polysiloxane resin is to be used in finely powdered form. The exact degree of fineness of powdering and the form in which, as powder, it is presented, are not critical. Preferably, it is presented in the form of flat flakes when hammer milling or other techniques make this feasible. Individual particles should be small enough not to be distinguishable to touch. All the siloxane resin particles should pass a bolting cloth or screen with not fewer than 100 linear mesh per inch, and particles finer than the maximum thus defined are desirable.

The polysiloxane resin filler is to be mechanically intimately bonded within the mechanical structure of the curing and cured epoxy resin. To this end, the presence of moisture, including unnoticeable sorbed moisture on the surfaces of the resin particles, is objectionable. Therefore, at some point before bringing the powdered polysiloxane resin into use, it is to be dried. In general, better results are obtained when drying the powdered resin than when attempting to achieve adequate dryness by drying the resin in lumps or large particles and thereafter grinding.

The method of drying may be any method of choice that does not introduce foreign matter. Washing, with a hygroscopic and volatile solvent, and drying, can be used. Such solvent includes absolute alcohol, and acetone. Drying in an oven with a moving air current and, preferably, with periodic disturbance and redistribution of the polysiloxane resin, is usually satisfactory. The exact duration of drying and the exact remaining level of moisture do not appear to be critical except that, in general, the substance should be brought to a water content as low as is feasible to attain, without recourse to chemical means. Oven drying carried out conscientiously has sufficed.

The polysiloxane resin is then mixed together with the uncured or partially cured polyepoxide resin conveniently by adding it to a precursor substance or to a plurality of such precursor substances together, in the absence of catalyst, to obtain a uniform mixture. Thereafter, if the siloxane is added to one of the precursors, the other precursor and catalyst are added. When the siloxane resin is added to a mixture of both precursors, catalyst alone need later be added if employed. Thereafter, the resin "sets" by conventional epoxy curing reaction, to become the highly cross-linked, resinous, essentially infusible, insoluble, filler-modified, coherent, adherent, release surface substance of the present invention.

The amount of polysiloxane resin to be employed according to the present invention can vary according to desired properties. Small amounts tend to confer upon the resulting resin mixture the desired property of avoiding the accumulations of film-forming deposits. Thus, amounts as small as 1/10 of 1 percent by weight of entire resin can be employed. Better surface release properties are obtained when using larger amounts, up to and including about 1 percent by weight of total resin. So far as is presently known, the best balance of good physical properties and surface release is usually obtained when employing from about 6 to about 20 percent of the polysiloxane by weight of total resin. Larger amounts than this can be employed, up to about 30 or 40 percent filler, but such larger amounts are not now known to serve any useful purpose, they tend to increase the cost of the resulting resin, and, if greatly exalted amounts are used, may tend to reduce its ability to adhere to the surface to which it is applied, and its strength and coherence.

Coloring and similar additive substances can be added to the composition of the present invention, if desired.

It is known to use glass cloth or fibers as a reinforcing substance in strengthening patches that are intended to cover large areas. The modified resin of the present invention can be used with such reinforcing. Also, when cost is a major factor, a simple epoxy resin can be used as a base resin, the remaining depth being filled by the modified resin of the present invention wherein the epoxy resin contains also the polysiloxane, whereby the entire surface exposed is a surface of the siloxane modified resin of the present invention.

The polysiloxane modified resin material of the present invention is particularly useful in repairing breaks in glass interior linings of vessels used in the production and storage of, for example, polymer latexes and like substances which are known to form films. Formation of films or fragments of films as contaminants in the latex itself is highly undesirable. The use of unmodified epoxy resin patches on the glass interior lining of a vessel which is then employed in the storage of a latex, which may be a styrene-butadiene or similar film-forming latex, typically results in the accumulation, over and upon such patch, of a film-like layer of polymer which can thereafter become free of the surface upon which it formed, and appear as a solid or semisolid, undesired contaminant body in what should be a homogeneous latex.

Substances other than latexes are sometimes similarly affected, and, in general, any film-forming or deposit-forming substance that is in a vessel may have a tendency to develop undesired contaminant films over epoxy resin, metal, and similar surfaces. The modified patch of the present invention obviates the problem, usually completely.

From the foregoing, skilled chemists will be able to practice the present invention. The best manner of practicing the invention now known to the inventor is exemplified as follows:

Quality control analysis discloses traces of iron appearing in the styrene-butadiene latex output from a glass-lined tank in which the latex is held in storage. When the iron contents recur during analysis over a period of time, and become more apparent, the storage vessel is disused and rinsed, and an operator enters the vessel to inspect visually. It is found that at a point on a sloping lower surface a few feet above the level of the floor of the building in which it is housed, the glass lining has spalled away with conchoidal fracture, exposing a small area of the iron wall of the storage vessel beneath. The fragments are not found.

The area is meticulously cleaned of latex deposit and it is found that the iron has corroded sufficiently to account for the iron discovered in the latex in quality control analysis. However, the wall of the vessel is not structurally badly weakened.

By the use of a power-driven rotary abrasive stone, the glass lining adjacent the break, and the partially corroded metal in the area defined in the center of the break, are abrasively removed to obtain a relatively uniform surface of which the only conspicuous features are the elongated scoring marks resulting from the action of individual abrasive grains in the abrasive stone. Except for dust from the grinding itself the resulting surface is essentially clean. The dust is carefully removed with a clean, dry brush, and the area lightly sandblasted and washed with, in sequence, denatured alcohol, aqueous ammonia, and denatured alcohol. It is then dried to an air dry condition.

A patch resin of the present invention is prepared, employing a commercial epoxy resin (DER 331) essentially the diglycidyl ether of bisphenol A. To this epoxy base resin is added finely powdered polymethylsiloxane resin of a degree of methyl substitution of about 1.5 in in an amount equal to 10 percent of the combined weight of the siloxane resin and the epoxy resin base material. The resulting mixture is thereafter mixed with a curing amount of diethylenetriamine in known procedures for the commercial resin, and the resulting siloxane filler modified, mixed, catalyst-hardening resin is applied with blades, here trowel and spatula blades, to the prepared break in the glass lining of the reactor vessel. The material is applied with considerable pressure to force wetting contact so far as possible between the resin and the prepared surface of the vessel and lining, and the exposed surface is carefully "troweled" to shape it in the form of a uniform, smooth, essentially featureless surface, its center bulging slightly above the unmodified line of the original glass lining of the vessel, and its edges uniform with the original wall line. In this condition, electric heat lamps are turned on the resulting patch from a distance of about a foot, sufficient to elevate the temperature of the patch to above 200°C., and maintain this temperature for a period of time sufficient to "cure" the epoxy resin by catalyzed reaction. At the end of this time, the heat lamps are gradually removed and the temperature of the reactor vessel wall and patch permitted to equilibrate with ambient temperature. Thereafter, the patched vessel is placed in service again in the storage of the styrene-butadiene latex as before.

Quality control analyses show that iron no longer appears in the product, and that no iron appears in the said product during a period of several months observation.

At the end of this time, and for other reasons, the reactor vessel is again disused and rinsed and its interior is inspected. It is observed that the patch according to the present invention shows almost no tendency to accumulate an adherent styrene-butadiene film, whereas other patches earlier applied using unmodified epoxy resin accumulate large and well-defined "skins" of styrene-butadiene resin film. The breaking loose of this adherent film and its appearance, from time to time, on screens through which the latex has to be passed prior to packaging, would be a serious problem. It is observed that the modified resin patch of the present invention obviates the problem, as to the patch so made.

In another application, a body member of a new automobile, comprising the right front fender, is removed, its under surface lightly sandblasted to expose a uniform surface of bright, bare metal. This is washed with acetone and air dried, and thereafter smoothly coated with a modified epoxy resin as hereinbefore described. The resin is heat cured. When curing is completed, the body member is reattached to the automobile, which is thereafter placed in service and observed.

It is noted that, whereas the other fenders, and in particular the left front fender, tend to accumulate adherent deposits of mud in summer and of snow and ice in water, the fender coated with the resin of this invention remains essentially free of adherent deposits.

In another form of the best mode known to the inventor to practice this invention, a standard, commercial white porcelain, flush-toilet body is formed and fired to biscuit finish, without glaze, and thereafter cooled. The outside is sprayed with a glaze frit, fired, and cooled. The interior, yet unglazed, is thereafter coated with a curable polyepoxide, substantially the diglycidyl ether of bisphenol A, together with about ten weight percent of polymonomethyl siloxane of a 1.5 degree of substitution, as a fine powder and rendered curable by addition of diethylenetriamine, the mixing, application and curing being carried out at room temperature. Care is taken to apply the resin uniformly, to achieve an essentially featureless surface.

The toilet bowl thus completed is placed in service, in a situation that admits of comparison with an otherwise identical toilet bowl of which the glaze finish is wholly conventional. The bowl bearing the resin of the present invention remains essentially clean while the conventional bowl accumulates a stained region at and below water level line, comprising adherent colonies of microflora and bound minerals, during an interval of 30 days with no chemical or mechanical cleaning.

In procedures similar to the foregoing, the interior surface of an industrial gas pipe is smoothly coated with the polymethylsiloxane modified epoxy resin of this invention, which is then heat cured, and placed in service carrying natural gas, is compared with an untreated pipe for rate of accumulation of paraffin deposit. This natural phenomenon in the piping of natural gas constricts and may close gas pipes. It is found that pipe innerly coated with the modified resin of the present invention accumulates paraffin at a rate much slower than uncoated pipe.

In further exemplification, the employed resin is a partial polymonophenylsiloxane having a degree of substitution of about 0.9, and prepared, conventionally, by the co-hydrolysis and co-cure of silicon tetrachloride and monophenyl trichlorosilane. Routinely, it is finely powdered to pass a 100-mesh bolting cloth and oven dried in moving air. This siloxane polymer is incorporated into a curable poly-1,2-epoxide mixture in an amount of about 5 weight percent of the total mixture. The curable polyepoxide is essentially an equivalent mixture of two commercial polyepoxides that are respectively, the diglycidyl ether of bisphenol A and a commercial epoxy novolak. It is mixed with a stoichiometric, curing amount of a commercial polyalkylene polyamine curing agent. Mixing of the curable polyepoxide mixture with the polysiloxane resin is carried out promptly, for the reason that the epoxy mixture is already involved in the process of cure and the employment of the product must be completed while it is yet workable.

The approaching slopes, throat, and valve of a hopper used in the commercial storage of dry beans, being conventionally lined with sheet metal, presents a recurring problem that the beans "bridge up" and make an immobile block which must be mechanically disturbed to permit the continued release of beans from the hopper through the valve. To obviate this problem, the hopper is emptied and disused; the sheet metal surface is grit-blasted with number 40 steel grit in an air pressure hose, and then vacuum cleaned, by an operator working from a suspended scaffolding which makes it unnecessary for him to make any contact, as with shoe-soles, with the clean metal surface. The curable modified polyepoxide mixture is disposed over and upon the metal surface, care being taken in its application to dispose it uniformly and in an essentially featureless manner, and providing, as far as possible, a uniform, smooth coating of the curable, polysiloxane-modified epoxy resin mixture.

The epoxy coating thus applied is permitted to stand, undisturbed and protected from dust and the like, until the epoxy resin has fully cured, approximately two days at bean-storage temperature.

Beans are thereafter elevated into the hopper which is substantially filled and returned to normal service. It is tested for bridging of beans during discharge, and the up the opposing side to meet itself at the top, and each of these bands is spaced relatively evenly apart from each other by untreated, cleaned, bare metallic surface. An atlas of the bands is provided, and records kept of the treatment of each, for subsequent evaluation of the various employed surface treatments. Beginning with a band at one end arbitrarily designated as number 1, and proceeding with appropriate masking, to the other end (ignoring the untreated gaps between) the bands are coated, except for a check band, with coatings applied by uniform "airless" spraying of uniformly thinned curable coating preparations, the thinning solvent being, in this case, methyl ethyl ketone. The applications are made according to the present invention as follows:

| Polyepoxide | Epoxy curing agent | Polysiloxane |
|---|---|---|
| Diglycidyl ether of bisphenol A | Commercial polyamine, substantially diethylene | None (check). |
| Do | do | $[(\langle\bigcirc\rangle)_{0.9}-SiO_{3.1}]_x$ |
| Do | 1,2-cyclohexane-di-carboxylic anhydride | $[(F_3C-CH_2-CH_2)_{.05}-SiO_{\frac{3.5}{2}}]_x$ |
| Do | Boron trifluoride complex with monoethyl amine | $[(CH_3)_{1.5}-Si-O_{2.5}]_x$ |
| Do | Metaphenylenediamine | $[(CH_3-CH_2)_{1.0}-Si-O_{3/2}]_x$ |
| Alpha, omega-di-1,2-epoxyethoxy polylower alkylene glycol, epoxide equivalent weight 305-335. | Commercial polyamine substantially triethylene tetraamine. | $[(CH_3)_{0.9}-Si-O_{\frac{3.1}{2}}]_x$ |
| Commercial epoxy novolak of average 3.8 1,2-epoxypropoxy groups per molecule and epoxy equivalent weight of 175.182. | "NMA" (methyl-5-norbornene-2,3-dicarboxylic anhydride). | None (check). |
| Do | do | $[(CH_3)_{1.75}-Si-O_{\frac{2.25}{2}}]_x$ |
| Polybrominated diglycidy ether of bisphenol A | Dodecenyl succinic anhydride | $[(\langle\bigcirc\rangle)_{0.5}-SiO_{\frac{3.5}{2}}]_x$ |
| 4,226,544 Partially cured diglycidyl ether of bisphenol A diluted with phenyl glycidyl ether. | Methylene dianiline | $[(\langle\bigcirc\rangle)_{1.75}-SiO_{\frac{2.25}{2}}]_x$ |
| Drying oil fatty acid ester product of diglycidyl ether of bisphenol A, equivalent weight 3,500-5,500. | Commercial hardener described by manufacturer as "reactive polyamide resin," soluble in uncured polyepoxide, formula unknown but believed to be based upon drying oils. | $[(F_3C-CH_2-CH_2)_{1.0}-SiO_{3/2}]_x$ |
| Polybrominated diglycidyl ether of bisphenol A | Dodecenyl succinic anhydride | None (check). |
| Polychlorinated diglycidyl ether of bisphenol A | Diaminodiphenyl sulfone | $[(F_3C-CH_2)_{1.3}-SiO_{\frac{2.7}{2}}]_x$ |
| Commercial epoxy novolak of average 3.8 1,2-epoxypropoxy groups per molecule and epoxy equivalent weight of 175-182. | Commercial polyamine, substantially tetraethylene pentamine. | $[(CH_3)_{1.0}-Si-O_{3/2}]_x$ |
| Reaction product of diglycidyl ether of bisphenol A with about three quarters molar equivalent of bisphenol A (epoxy equivalent weight > 1,500). | | $[(\langle\bigcirc\rangle)_{1.1}-SiO_{\frac{2.9}{2}}]_x$ | phenomenon is not observed to occur. The problem of the bridging-up of the beans is obviated.

Also, experimentally, a tank car is disused, illumination and ventilation are provided for its interior and the interior surface of the tank car is then meticulously cleaned. The cleaning process involves mechanical removal of latex "skins", a water rinse with pressure hoses, air-drying, light grit-blasting with number 40 steel grit, and the vacuum brush removal of grit and particles freed by sandblasting.

The surface interior of the tank car thus cleaned is used experimentally to test areas coated with various resins modified according to the present invention.

The instant tank car tank interior is of 87 inches diameter and of a gross length of 33 feet 9 inches measured to the depth of the domed heads. It is of a nominal capacity of 10,000 gallons.

Within the tank, with chalk, 15 circumferential bands encircling the tank are defined, each starting at the top, passing down one side and across the floor and The tank car is experimentally filled with film-forming styrene-butadiene latex which, on past experience, has uniformly given a problem of leaving an undesired deposit of loosely agglomerated polymer film on a conventional epoxy resin tank car interior lining. The filled car is permitted to stand for a week in summer weather in a southern state unprotected, and at the end of that time the latex contents is pumped back into stationary storage, and the interior of the car inspected. Inadmissibly severe deposits uniformly cover those circumferential bands that are cleaned but not coated, separating the test bands. Polymer film deposits appear irregularly over the surface of the epoxy resin bands not modified according to this invention, varying from a little more than half the area to almost the entire area of the test band. Upon the area of the bands of epoxy resin modified according to this invention by mechanical inclusion therein of finely powdered polysiloxane resin, deposits take the form of dried residues of isolated droplets: these are found most abundantly in a zone defined by an arc of 20° each side of vertex, and a similar zone towards the tank bottom: even so, they represent a fragmentary deposit much lighter than the lightest deposit on a check band. A narrow pool of latex running the length of the car at the bottom is ignored in taking these observations.

An operator with a hose delivering water under pressure of about 80 pounds per square inch, gauge, using routine procedures, hoses down the car interior. All bands coated with epoxy resin modified according to this invention wash apparently clean; parts of each of the check bands retain adherent latex coatings, and all the untreated area of the tank interior remains heavily coated.

In the instant specification and claims the expression "polyepoxide" is used to designate a composition of which a representative molecule comprises an average of more than one 1,2-epoxyalkyl groups which is further characterized in that it is reactive under the influence of catalyst or coreactant to obtain a cured product.

The cured product obtained from the reaction of a polyepoxide is designated an "epoxy resin"; and the term is occasionally used to designate either the starting material of the cured product indifferently.

What is claimed is:

1. Method of coating an area of a solid surface exposed to probable accumulation of undesired surface deposits that comprises the step of applying as an essentially smooth, adherent conforming coat, to the area, a curable polyepoxide that hardens to become insoluble by reaction of epoxy resin precursor substances under curing agent influence, said resin being modified by containing, as finely subdivided filler, a polysiloxane in the amount of from 0.1 to about 20 percent by weight of combined said siloxane and resin substances said polysiloxane being insoluble in said polyepoxide whereby there is formed an insoluble coating the surface of which is characterized by a tendency to release much more readily than the same epoxy resin unmodified, said polysiloxane being of the formula

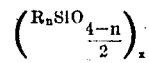

wherein R is a monovalent hydrocarbon radical or a halogenated monovalent hydrocarbon radical $n$ is a number from 0.9 to 1.5 and $x$ is a number representing the degree of polymerization.

2. Method of claim 1 wherein R is methyl.

3. Method of claim 1 wherein the polyepoxide is the reaction product of about one mole of 4,4-isopropylidenediphenol and two moles epichlorohydrin.

4. Method of claim 3 wherein the area is an area defining a break in a glass lining of a glass lined industrial vessel.

5. Method of claim 1 wherein the surface is a ceramic surface.

6. Method of claim 1 wherein the solid surface is a metal surface.

7. Method of claim 6 wherein the metal surface is the surface of a tank.

8. Method of claim 7 wherein the tank is the tank of a wheeled tank vehicle that is a railroad tank car or a highway tank truck body.

* * * * *